(12) United States Patent
Sundaram (10) Patent No.: US 10,296,890 B2
(45) Date of Patent: *May 21, 2019

(54) SYSTEMS AND METHODS FOR PROVIDING PAYMENT HOTSPOTS

(71) Applicant: PAYPAL, INC., San Jose, CA (US)

(72) Inventor: Magesh Babu Meignana Sundaram, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/729,467

(22) Filed: Oct. 10, 2017

(65) Prior Publication Data

US 2018/0130043 A1    May 10, 2018

Related U.S. Application Data

(63) Continuation of application No. 15/247,754, filed on Aug. 25, 2016, now Pat. No. 9,785,932, which is a continuation of application No. 14/504,204, filed on Oct. 1, 2014, now Pat. No. 9,449,318.

(51) Int. Cl.
| | |
|---|---|
| *G06F 17/00* | (2019.01) |
| *G06Q 20/22* | (2012.01) |
| *G06Q 20/10* | (2012.01) |
| *G06Q 20/32* | (2012.01) |

(52) U.S. Cl.
CPC .......... *G06Q 20/223* (2013.01); *G06Q 20/10* (2013.01); *G06Q 20/3224* (2013.01); *G06Q 20/3278* (2013.01)

(58) Field of Classification Search
CPC .. G06Q 20/223; G06Q 20/10; G06Q 20/3224; G06Q 20/3278
USPC .................................................. 235/375, 379
See application file for complete search history.

(56) References Cited

U.S. PATENT DOCUMENTS

| | | | |
|---|---|---|---|
| 8,700,527 B2* | 4/2014 | Dolphin | G06Q 20/10 |
| | | | 705/35 |
| 9,129,273 B2* | 9/2015 | Baldwin | G06Q 20/20 |
| 2004/0030659 A1* | 2/2004 | Gueh | G06Q 20/3674 |
| | | | 705/67 |
| 2007/0087682 A1 | 4/2007 | DaCosta | |
| 2009/0193500 A1 | 7/2009 | Griffin et al. | |
| 2010/0078471 A1 | 4/2010 | Lin et al. | |
| 2011/0313921 A1* | 12/2011 | Dheer | G06Q 20/10 |
| | | | 705/42 |

(Continued)

*Primary Examiner* — Paultep Savusdiphol
(74) *Attorney, Agent, or Firm* — Haynes and Boone LLP (57) ABSTRACT

Systems and methods are provided for facilitating payments between users of the system such as person-to-person payments using a payment hotspot. A payment hotspot or payspot may be generated by a first user device of a first user to facilitate a transfer of funds between the first user and the second user. The payspot may be a virtual payment portal that allows secure payment between the users without either of the users having to provide identifying information to the other user. The payspot may be accessed by the second user based on the proximity of a second user device of the second user to the first user device or the first user may provide an identification code of the payspot to the second user. The second user may access the payspot by communicating with a payment server with the second user device, through the first user device.

20 Claims, 7 Drawing Sheets

(56) References Cited

U.S. PATENT DOCUMENTS

| | | | |
|---|---|---|---|
| 2012/0158589 A1* | 6/2012 | Katzin | G06Q 20/12 705/44 |
| 2012/0253974 A1 | 10/2012 | Haikonen et al. | |
| 2013/0018785 A1* | 1/2013 | Dolphin | G06Q 20/10 705/40 |
| 2013/0018791 A1* | 1/2013 | Mendicino | G06Q 20/10 705/44 |
| 2013/0036000 A1* | 2/2013 | Giordano | G06Q 40/02 705/14.27 |
| 2013/0085931 A1* | 4/2013 | Runyan | G06Q 20/322 705/40 |
| 2013/0138518 A1* | 5/2013 | White | G06Q 20/204 705/16 |
| 2013/0144731 A1* | 6/2013 | Baldwin | G06Q 20/20 705/17 |
| 2013/0198061 A1* | 8/2013 | Dheer | G06Q 20/10 705/39 |
| 2013/0218721 A1* | 8/2013 | Borhan | G06Q 20/322 705/26.41 |
| 2013/0238488 A1* | 9/2013 | Bouey | G06Q 20/10 705/39 |
| 2013/0238489 A1* | 9/2013 | Bouey | G06Q 20/10 705/39 |
| 2013/0238490 A1* | 9/2013 | Bouey | G06Q 20/10 705/39 |
| 2013/0238491 A1* | 9/2013 | Bouey | G06Q 20/10 705/39 |
| 2013/0238492 A1* | 9/2013 | Muthu | G06Q 20/10 705/39 |
| 2014/0067462 A1* | 3/2014 | Korosec | G06Q 30/0201 705/7.29 |
| 2014/0337175 A1* | 11/2014 | Katzin | G06Q 20/204 705/26.62 |
| 2014/0351118 A1* | 11/2014 | Zhao | G06Q 20/3224 705/40 |
| 2015/0012426 A1* | 1/2015 | Purves | G06Q 30/0623 705/41 |
| 2015/0066765 A1* | 3/2015 | Banks | G06Q 40/02 705/44 |
| 2015/0073907 A1* | 3/2015 | Purves | G06Q 20/32 705/14.58 |
| 2015/0134507 A1* | 5/2015 | Lucas | G06Q 20/10 705/39 |
| 2015/0134508 A1* | 5/2015 | Lucas | G06Q 20/10 705/39 |
| 2015/0149357 A1* | 5/2015 | Ioannidis | G06Q 20/3224 705/44 |

* cited by examiner

SYSTEMS AND METHODS FOR PROVIDING PAYMENT HOTSPOTS

CROSS REFERENCE TO RELATED APPLICATIONS

This application is a continuation of U.S. patent application Ser. No. 15/247,754, filed Aug. 25, 2016, now U.S. Pat. No. 9,785,932, issued Oct. 10, 2017, which is a continuation of U.S. patent application Ser. No. 14/504,204, filed Oct. 1, 2014, now U.S. Pat. No. 9,449,318, issued Sep. 20, 2016, all of which are hereby incorporated by reference in their entirety.

TECHNICAL FIELD

The present disclosure generally relates to electronic commerce and, more particularly, relates to methods and systems for securely transferring funds between users.

BACKGROUND

The use of mobile devices, such as cellular telephones, to make purchases is well known. Such mobile devices may be used to make purchases from brick and mortar stores and from online stores. For example, such mobile devices may be used to pay for purchases via a credit card, debit card, gift card, or an account with a payment provider. Generally, a single person will pay for a purchase. However, there are instances where it is desirable to share the payment for a purchase among a plurality of people or to make payments directly between two or more people.

Systems have been developed in which a person may use their mobile phone to make a payment directly to a mobile phone of another person. However, in conventional systems, in order to facilitate such a payment one or both of the participants must transmit sensitive personal and/or financial information such as a user identifier (ID) or a phone number to the other participant. In many situations, a person may hesitate to use such as system when the other participant is not trusted or known to the person.

It would therefore be desirable to be able to provide improved systems and methods for transferring funds between users.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Methods and systems are provided for facilitating person-to-person (P2P) mobile payments. According to an embodiment, a first user may use a first user device to generate a payment hotspot (sometimes referred to herein as a "payspot") and broadcast that payment hotspot in a local region around the user device. A second user may operate a second user device to detect the payment hotspot and make a payment to the payment hotspot. In this way, payments may be made from the second user to the first user without the first user having to provide the second user with any user-identifying information. For example, the second user can communicate with a payment provider server through a first user device (e.g., via the payspot generated by the first user device).

These person-to-person payments may facilitate the sharing of payments among two or more users for products and/or services without requiring the exchange of user-identifying information of any of the users. For example, these P2P payments may facilitate splitting of a bill at, for example, a restaurant. In this example, a group of friends may eat a meal together at a particular restaurant and a first one of the users may pay the bill for the meal and create a payspot having a payspot identifier. One or more other users may send payments for their portions of the bill to the payspot identifier. A third party server such as a payment provider server may facilitate the transfer of funds from the one or more other users to the first user by associating the payspot identifier with an account of the first user and providing the payment to the account of the first user.

Improvements to financial transaction processing systems are therefore provided by providing networked computing systems having previously non-existent payspot modules that generate, detect, interact with, and manage processes for a payspot that improve the functioning of the system itself for processing financial transactions.

According to an embodiment, a system may include one or more hardware memories storing account information for a first user; and one or more hardware processors operable to: generate a payment hotspot that is associated with the account information of the first user and that is visible to a second user; receive a payment at the payment hotspot from the second user; and facilitate a transfer of funds to the first user based on the payment and the account information of the first user.

At least one of the one or more memories may be a memory of a first user's mobile device. At least one of the one or more memories may be a memory of a server. At least one of the one or more memories may be a memory of a second user's mobile device. At least one of the one or more processors may be a processor of a first user's mobile device. At least one of the one or more processors may be a processor of a server. At least one of the one or more processors may be a processor of a second user's mobile device.

According to an embodiment, a computer program product may comprise a non-transitory computer readable medium having computer readable and executable code. The code may be for instructing one or more processors to perform any of the methods discussed herein.

Figure 1:
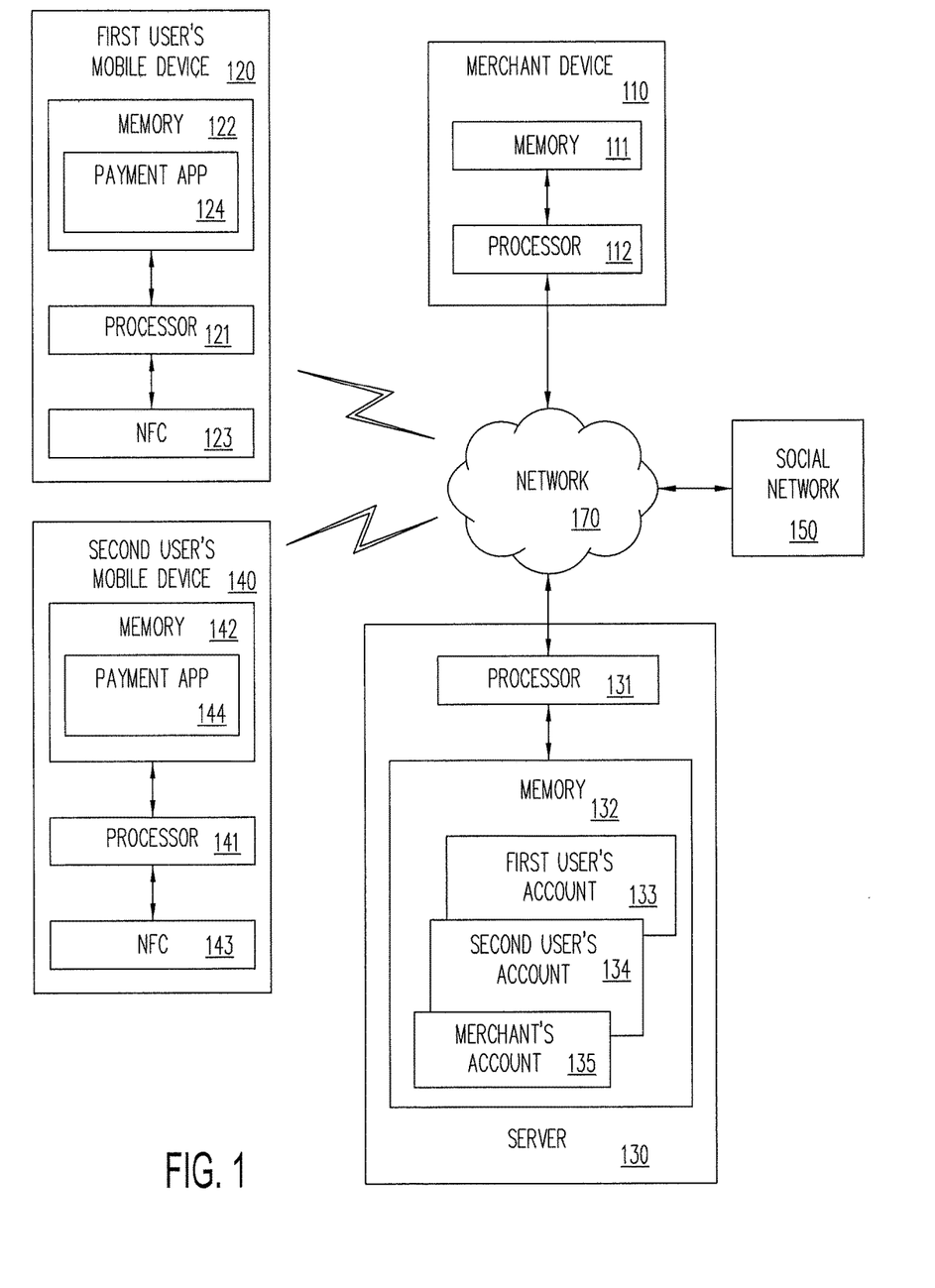
FIG. 1 is a block diagram of an illustrative networked system suitable for implementing processes for transfer of funds, according to an embodiment.

FIG. 1 is a block diagram of a system for providing mobile payments such as person-to-person mobile payments, according to an embodiment. The system may include a merchant device 110. The merchant device 110 may be a merchant checkout terminal, a computer, and/or a server, for example. The merchant device 110 may include a memory 111 and a processor 112. The merchant device 110 may be used for accepting a payment for a product and/or service being purchased from the merchant. Note that the merchant or a merchant device can generally be any entity or device receiving funds, including an individual.

The system may include a first user's mobile device 120. The first user's mobile device 120 may be carried by the first user. The first user's mobile device 120 may be a cellular telephone, a smart telephone, a hand held computer, a laptop computer, a notebook computer, a wearable computing device, or a tablet computer, for example. The first user's mobile device 120 may include a processor 121, a memory 122, and/or communications circuitry such as a near field communications (NFC) device 123 and/or other communications circuitry such as WiFi communications circuitry, cellular communications circuitry, Bluetooth communications circuitry, Bluetooth® Low Energy (BLE) communications circuitry, etc. The first user's mobile device 120 may be NFC enabled, WiFi enabled, cellular enabled, Bluetooth enabled, BLE enabled, etc.

The first user's mobile device 120 may be used to generate a payment hotspot. A payment hotspot may be a virtual payment portal with an identifier such as a name. The first user's mobile device 120 may be used to broadcast the name of the payment hotspot within a local area of the first user's mobile device 120 (e.g., to other devices within a virtual fence defining a perimeter around the first user's mobile device, sometimes referred to herein as a geo-fence). The first user's mobile device 120 may be used to pay the merchant for the product and/or service purchased. In one embodiment, the merchant may generate a payspot for receiving payments from the first user and/or payments from other users.

A payment application (app) 124 may be stored in the memory 122 and executed by the processor 121. The payment app 124 may be used for generating the payment hotspot. For example, the shared payment app 124 may communicate with one or more servers such as server 130 (e.g., a payment provider server) to request generation of the payment hotspot, receive an identifier or name of the payment hotspot, and broadcast the name of the payment hotspot for detection by the second user's mobile device 140.

The system may include one or more second users' mobile devices 140. The system may include any number of second users' mobile devices 140. For example, the system may include one, two, three, five, ten, twenty five, one hundred, or more second users' mobile devices. The second users' mobile devices 140 may be carried by any number of second users. The second users' mobile devices 140 may be cellular telephones, smart telephones, hand held computers, laptop computers, notebook computers, wearable computing devices, or tablet computers, for example. Each mobile device 140 may similarly include a processor 141, a memory 142, and/or communications circuitry such as a near field communications (NFC) device 143 and/or other communications circuitry such as WiFi communications circuitry, cellular communications circuitry, Bluetooth communications circuitry, Bluetooth® Low Energy (BLE) communications circuitry, etc. The second user's mobile device 140 may be NFC enabled, WiFi enabled, cellular enabled, Bluetooth enabled, BLE enabled, etc. A payment app 144 may be stored in the memory 142 and executed by the processor 141.

The second users' mobile devices 140 may be used to detect and/or connect to a payment hotspot generated by the first user and broadcast using the first user's mobile device.

The payment app 144 may be executed by the processor 141. The payment app 144 may be used to detect one or more payment hotspots, to receive a payment hotspot identification code from the second user, connect to a payment hotspot and/or provide a payment to one or more payment hotspots.

The system may include one or more servers 130. The server 130 may be a server of a bank, a credit card company, a payment provider such as PayPal, Inc., or any other entity. The server may be a server of an intermediary, such as a payment facilitating intermediary. The server 130 may represent a single server or a plurality of servers. The server 130 may include one or more processors 131 and a memory 132. The memory 132 may be a memory of the server 130 or a memory that is associated with the server 130. The memory 132 may be a distributed memory. The memory 132 may store a first user's account 133, one or more second users' accounts 134, and one or more merchant's accounts 135.

The server 130 may be used for facilitating payment from the first user and one or more second users to the merchant, from the first user to the second user and/or from the second user to the first user. The server may have other functions, as well. For example, the server may be used for other (non-hotspot) payment processing functions.

The system may include one or more third-party servers such as a social network server 150, an email server, or other server that may be used by the first user and/or one or more of the second users. The social network 150 may contain information regarding the first user and/or the second users. For example, the social network 150 may contain user location information, user preference information, user purchase history information or other information for the first user and/or the second user.

The merchant device 110, the first user's mobile device 120, the second users' mobile devices 140, the server 130, and the social network 150 may communicate with one another via a network 170, such as Internet. The merchant device 110, the first user's mobile device 120, the second users' mobile devices 140, the server 130, and the social network 150 may communicate with one another via one or more networks, such as local area networks (LANs), wide area networks (WANs), cellular telephone networks, and the like. The merchant device 110, the first user's mobile device 120, the second users' mobile devices 140, the server 130, and the social network 150 may communicate with one another, at least partially, via one or more near field communication (NFC) methods or other short range communications methods, such as infrared (IR), Bluetooth, WiFi, BLE, and WiMax.

As shown, the network-based system of FIG. 1 may include or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It may be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
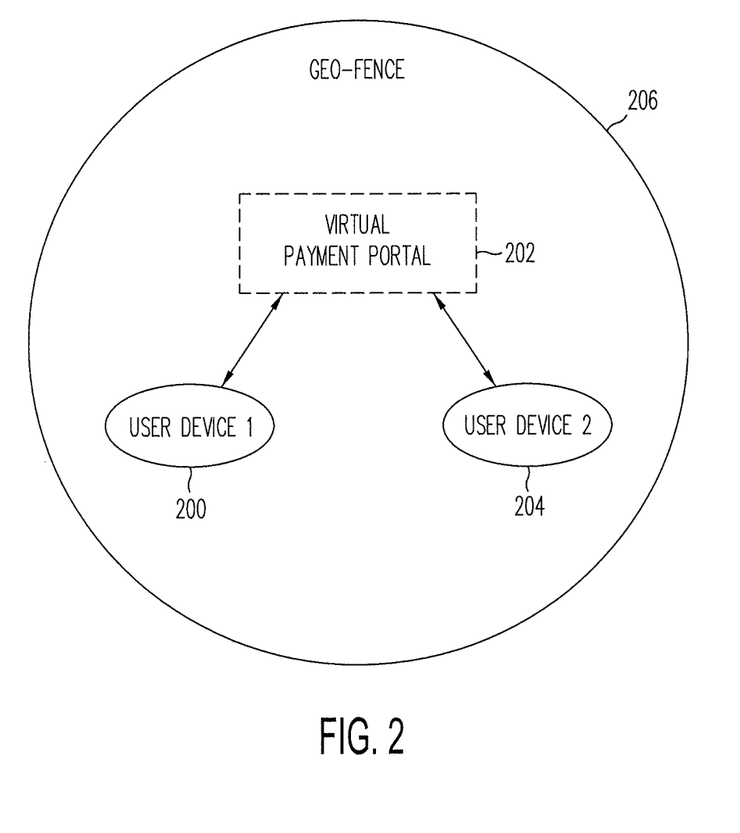
FIG. 2 is a diagram of an illustrative virtual payment portal located with a geo-fence, according to an embodiment.

A payment hotspot generated by a mobile device of the first user (e.g., mobile device 120) may be discoverable and/or accessible within a particular volume of space (e.g., a geo-fence) around the first user's mobile device or may be accessible using an identification code associated with the first user's mobile device. FIG. 2 shows an example of a payment hotspot that is accessible within a geo-fence.

As shown in FIG. 2, a first user device 200 (e.g., USER DEVICE 1) may generate a virtual payment portal (also referred to as a payment hotspot or payspot) 202. User device 200 may broadcast an identifier of the virtual payment portal such as a payspot name. User device 200 may broadcast the identifier using short range communications circuitry such as NFC circuitry, Bluetooth® circuitry, or WiFi circuitry having a range that defines the boundaries of a geo-fence 206 so that the virtual payment portal is only detectable by other devices within the geo-fence 206. Geo-fence 206 may be a virtual perimeter around first user device. 200 that encloses a volume around user device 200 such as a volume within a distance of 1 cm, 5 cm, 10 cm, 1 m, 5 m, 10 m, 50 m, or 100 m (as examples).

A second user device 204 (e.g., USER DEVICE 2) within the geo-fence 206 may include communications circuitry capable of detecting the existence of the virtual payment portal 202 (e.g., by detecting the broadcast communication from first user device 200). Second user device 204 may be provided access to the virtual payment portal 202 based on the location of second user device 204 within geo-fence 206 or may be used to provide a code or other access information to the virtual payment portal to obtain access to the portal. Second user device 204 may be used to prompt a user of device 204 to enter a payment amount to be provided to the first user via the virtual payment portal and may provide authorization to the virtual payment portal 202 to provide payment from an account of the user of second user device 204 to the user of first user device 200.

Figure 3:
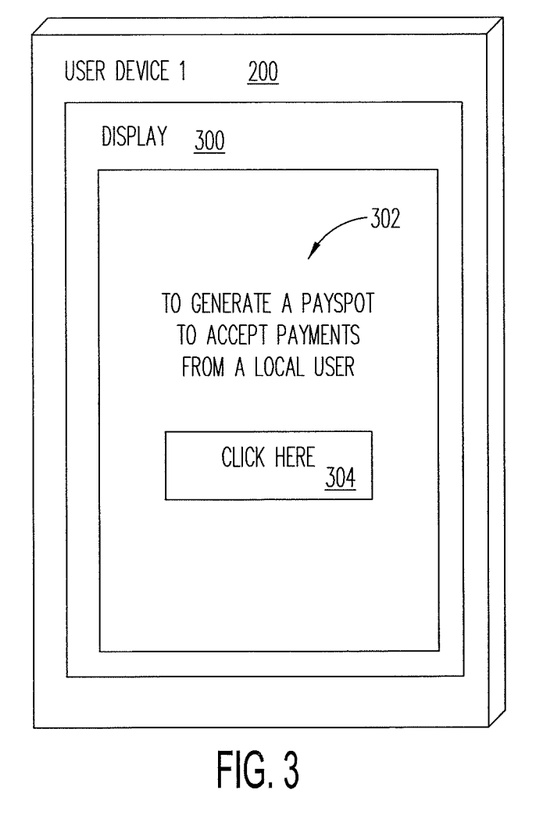
FIG. 3 is a block diagram of an illustrative user device showing how the user device may be operated to provide the user with the ability to set up a payspot, according to an embodiment.

First user device 200 may be used to prompt the user of first user device 200 to initiate generation of the payment hotspot 202. For example, as shown in FIG. 3, first user device 200 may include a display 300 that (e.g., when the user of first user device 200 initiates a payment app) provides instructions 302 to the user to generate the payment hotspot (e.g., text such as "TO GENERATE A PAYSPOT TO ACCEPT PAYMENTS FROM A LOCAL USER CLICK HERE"). As shown in the example of FIG. 3, the instructions may include a virtual or real "CLICK HERE" button 304 that initiates generation of the payspot.

When the user of first user device 200 initiates generation of the payspot, first user device 200 may communicate with one or more servers such as a payment server to generate the payment hotspot and obtain a unique identifier of the payment hotspot. For example, the server may manage the generation of payment hotspots of multiple users so that each payment hotspot has a unique identifier to facilitate payments to the desired account. The server may generate the payment hotspot and the identifier and provide the identifier to the first user device. The first user device may then broadcast the identifier and provide other devices such as second user device 204 with access to the payment hotspot via the communications circuitry of first user device 200.

Figure 4:
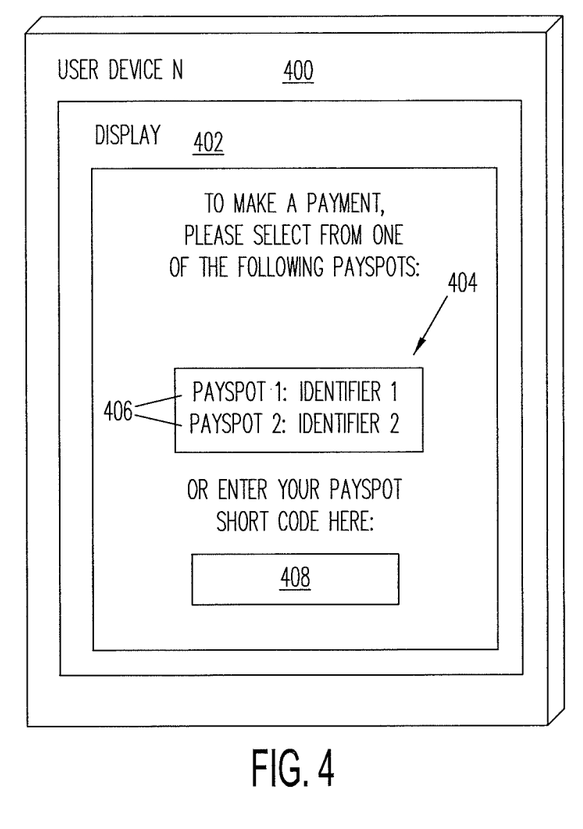
FIG. 4 is a block diagram of an illustrative user device showing how the user device may be operated to provide the user with the ability to connect to a payspot, according to an embodiment.

As shown in FIG. 4, an Nth user device 400 (e.g., the second user device 204 of FIG. 2 or any other user device) may include a display 402 that can be used to provide a user of the Nth user device with options for making one or more payments to one or more payment hotspots. In the example of FIG. 4, Nth user device 400 provides, using display 402, a list 404 of payment hotspots 406 (e.g., PAYSPOT 1 and PAYSPOT 2) each having a corresponding identifier (e.g., IDENTIFIER1 and IDENTIFIER 2), A first user that has generated the payment hotspot may provide the identifier of one of the hotspots to the user of Nth user device 400 (e.g., verbally or by written or electronic communication) so that the user of Nth user device 400 can select the payment hotspot for providing payment to that first user. Payspots may also be filtered by the payment provider, such as only showing payspots generated first users with some sort of connection to the Nth user, such as through previous transactions, social network data, contact lists, and the like.

The user of Nth user device 400 may tap, click, or otherwise select one of the payment hotspots 406 in list 404 and provide a payment to that selected payspot. However, this is merely illustrative. In other configurations, Nth user device 400 may be arranged to connect to all available payspots and/or to provide the user with an entry box 408 for entering a known identifier (e.g., a short code) of a payment hotspot to which the user wishes to connect (e.g., a payspot that is not discoverable).

Figure 5:
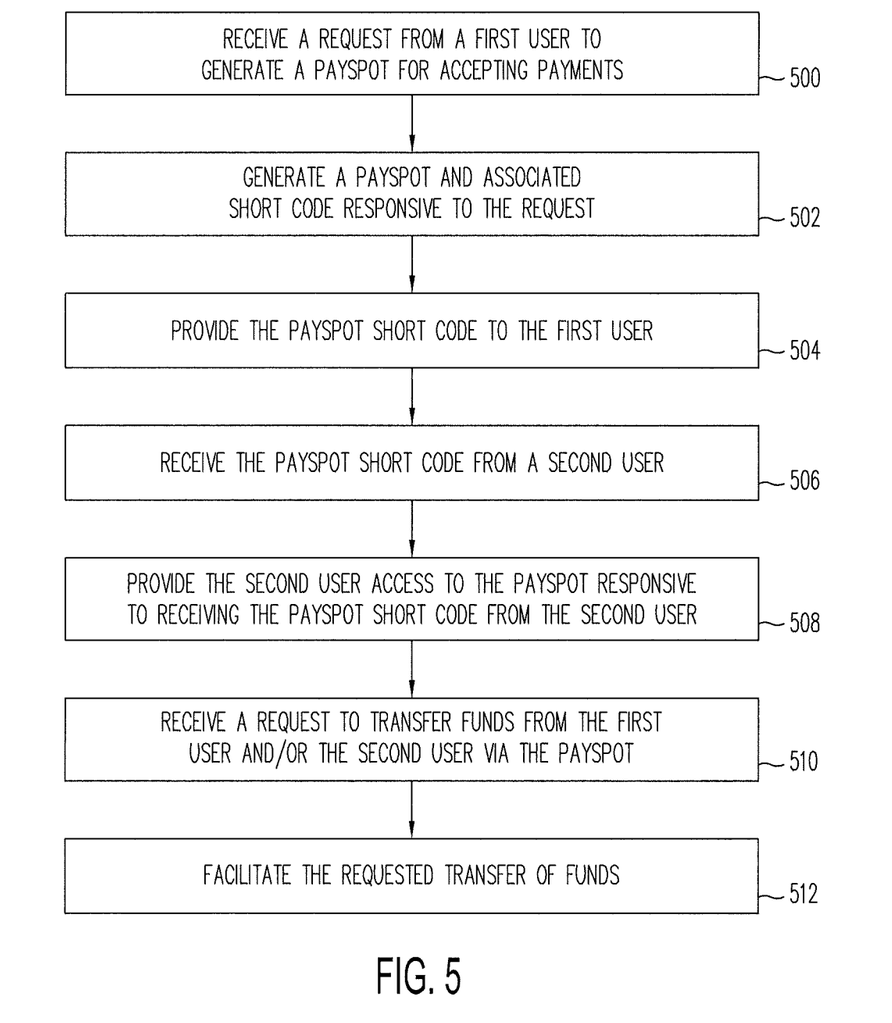
FIG. 5 is a flowchart of an exemplary process for facilitating funds transfers using a payspot having an associated access code, according to an embodiment.
Figure 6:
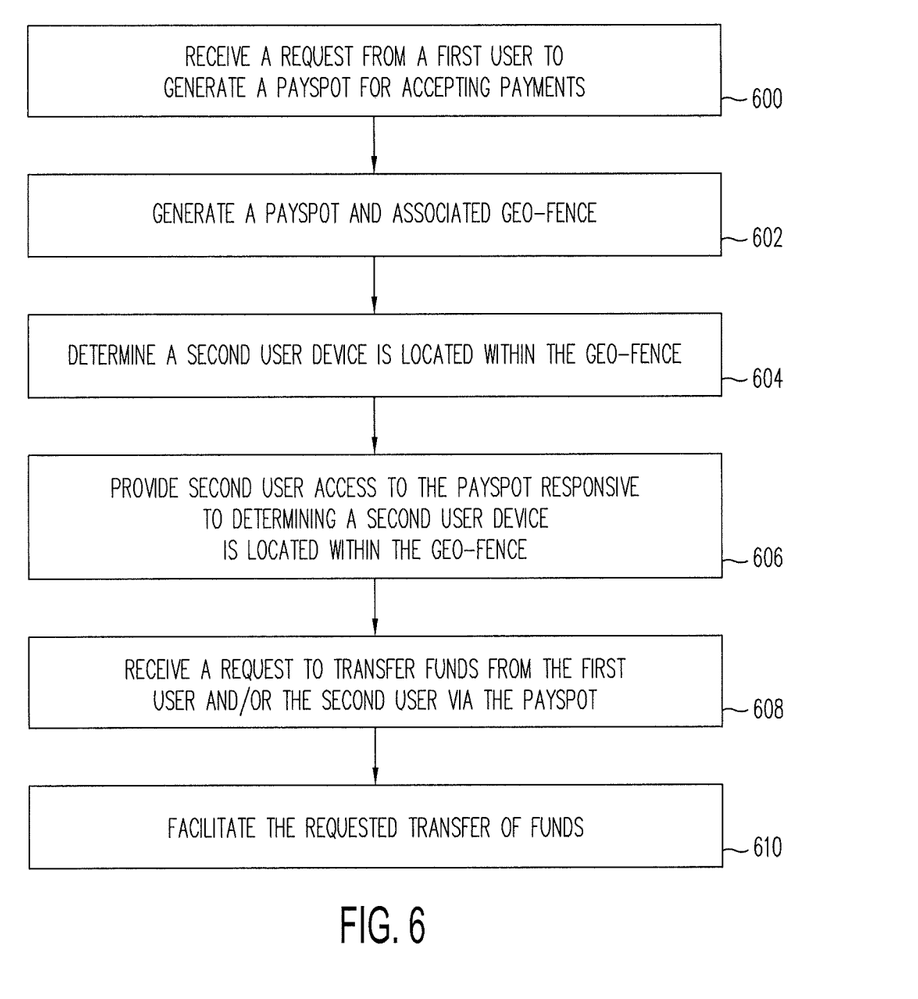
FIG. 6 is a flowchart of an exemplary process for facilitating funds transfers using a payspot having an associated geo-fence, according to an embodiment.

FIGS. 5 and 6 are flowcharts of illustrative operations that may be performed for facilitating transfer of funds between users using payment hotspots. In the example of FIG. 5, access to the payment hotspot is provided to a user based on an identification code provided by the user. In the example of FIG. 6, access to the payment hotspot is provided based on the location of the user's device.

Illustrative operations that may be performed for facilitating transfer of funds between users of a system using a hotspot having an identifier such as a short code are shown in FIG. 5.

At step 500, a server such as a payment provider server may receive a request from a first user to generate a payment hotspot (payspot) for accepting payments. The request from the first user may be received from a mobile device of the first user.

At step 502, the server and/or the mobile device of the first user may generate a payspot and an associated identifier such as a short code responsive to the request. For example, the server may activate the payspot and generate the associated identifier by creating a unique identifier that is not currently being used to identify any other payspots in the current area or more generally anywhere and associating that identifier with an account of the first user.

At step 504, the server may provide the identifier (e.g., the short code) to the first user (e.g., by sending a communication to the mobile device of the first user containing the identifier). In other embodiments, the first user may select or create its own payspot identifier, such as selection from a dropdown menu or data entry into a field. The first user device may generate the payspot using the provided identifier (e.g., by broadcasting the identifier).

At step 506, the server and/or the mobile device of the first user may receive the identifier (e.g., the short code) from a second user. For example, the server may receive the short code directly from a mobile device of the second user, the first user device may receive the short code directly from the mobile device of the second user, or the first user device may receive the short code from the mobile device of the second user and relay the short code to the server or provide confirmation to the server that the short code has been received. In this way, the second user device can communicate with the payment provider server via the first user device.

At step 508, the server and/or the first user device may provide the second user access to the payspot responsive to receiving the short code from the second user. For example, the first user device may provide the mobile device of the second user with access to the payspot when the short code is received from the mobile device of the second user or when the server provides confirmation to the first user device that the short code has been received from the second user. As another example, the server may provide the mobile device of the second user with access to the payspot when the short code is received from the mobile device of the second user via the mobile device of the first user.

At step 510, the server may receive a request to transfer funds between the first and second users via the payspot. For example, the server may receive a request from the mobile device of the second user to provider payment from an account of the second user to an account of the first user associated with the payspot identifier. The server may receive the request from the mobile device of the second user through the communications circuitry of the first user device (e.g., the first user device may relay the request from the mobile device of the second user to the server).

At step 512, the server may facilitate the requested transfer of funds. The server may facilitate the requested transfer of funds by transferring funds from an account of the second user to an account of the first user or otherwise facilitating a payment from the second user to the first user (or from the first user to the second user).

Illustrative operations that may be performed for facilitating transfer of funds between users of a system using a hotspot having an associated geo-fence are shown in FIG. 6.

At step 600, a server such as a payment provider server may receive a request from a first user to generate a payment hotspot (payspot) for accepting payments. The request from the first user may be received from a mobile device of the first user.

At step 602, the server and/or the mobile device of the first user may generate a payspot and an associated geo-fence responsive to the request. For example, the server may activate the payspot by creating a unique identifier that is not currently being used to identify any other payspots and associating that identifier with an account of the first user. The first user may select or enter a specific payspot identifier, such as "Joe's Store" or "Bill's Birthday Party." The server and/or the mobile device of the first user may generate the geo-fence by generating a payspot that is only accessible within a specified detected distance of the first user device or the server may generate a payspot that is accessible to all devices that can detect the payspot, thereby allowing the geo-fence to be defined by the broadcast communications circuitry of the first user device (e.g., by a range of the broadcast communications circuitry). The first user may set the distance or the distance may be set or suggested by the payment provider. For example, for the former, the first user may want to collect money for a birthday party at a restaurant and thus may set the distance to be within the restaurant or within the restaurant and parking areas for the restaurant. For the latter, an example may be a fairly limited distance set by the payment provider if there are many other payspots in the area, such that users are not shown too many available payspots in their area. A time duration or expiration may also be associated with the payspot. For example, the first user may set a time duration corresponding to the length of time the first user is expecting to be at the location accepting payments, such as 6 hours or until 5 p.m. for a sales booth. In other embodiments, the payment provider may automatically terminate the payspot upon detecting the first user has left the payspot area and is unlikely to return for receiving more payment. For example, the first user may be detected leaving the geofence and traveling in a direction to the first user's home at a high rate of speed (e.g., indicating travel in a car), based on an expected duration of the payspot, time of day, length of time away from the payspot, and/or other indicators that the first user is finished using the payspot to receive funds.

At step 604, the server and/or the first user device may determine that a second user device is located within the geo-fence. The server and/or the first user device may determine that the second user device is located within the geo-fence by receiving a communication to the payspot (e.g., to the server via the first user device based on a broadcast payspot identifier from the first user device) from the second user device indicating that the second user device has detected the presence of the payspot and is therefore within the geo-fence.

At step 606, the server and/or the first user device may provide the second user access to the payspot responsive to determining that the second user device is located within the geo-fence. For example, the first user device may provide the mobile device of the second user with access to the payspot by broadcasting an identifier of the payspot to all devices within a given range (e.g., a predetermined range or a communications range of the first user device).

At step 608, the server may receive a request to transfer funds between the first and second users via the payspot. For example, the server may receive a request from the mobile device of the second user (e.g., via the first user device) to provide payment from an account of the second user to an account of the first user associated with the payspot identifier. The server may receive the request from the mobile device of the second user through the communications circuitry of the first user device (e.g., the first user device may relay the request from the mobile device of the second user to the server).

At step 610, the server may facilitate the requested transfer of funds. The server may facilitate the requested transfer of funds by transferring funds from an account of the second user to an account of the first user or otherwise facilitating a payment from the second user to the first user (or from the first user to the second user).

Figure 7:
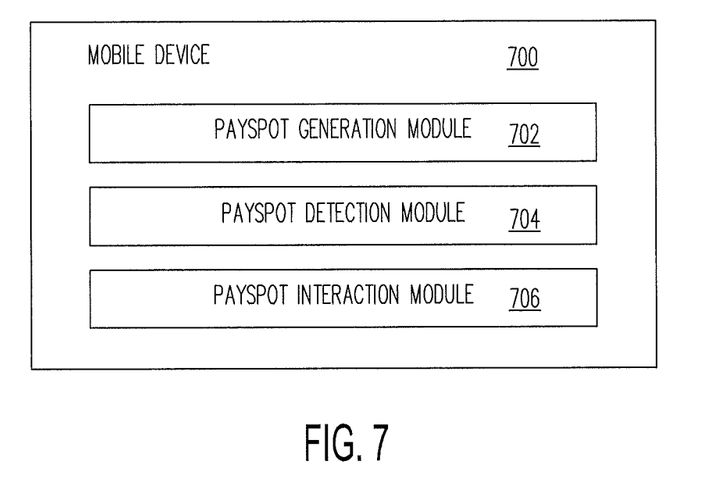
FIG. 7 is a block diagram of an improved mobile device, the functioning of which is modified by the inclusion of various payspot modules for processing transfers of funds according to an embodiment.

FIG. 7 shows an embodiment of a mobile device (e.g., an implementation of first user's device 120 or second user's device 140 of FIG. 1) that may be used for generating and/or sending payments to a payment hotspot as described herein. As shown in FIG. 7, mobile device 700 may include one or more payspot processing modules that provide specific improved mobile device functionality for facilitating person-to-person payments without exposing user-identifying information.

The payspot processing modules of mobile device 700 may include payspot generation module 702, a payspot detection module 704, and/or a payspot interaction module 706. Payspot generation module 702 may communicate with a payment provider server 130 to request and receive a unique identifier of a new payspot and may generate the payment hotspot (payspot) by broadcasting the identifier of the payment hotspot from the mobile device. For example, payspot generation module 702 may operate communications circuitry of mobile device 700 (e.g., communications circuitry included in payspot generation module 702 and/or other communications circuitry of mobile device 700) to communicate with the payment provider server and/or to broadcast the payspot identifier. The communications circuitry may be short-range communications circuitry (e.g., NFC circuitry, Bluetooth circuitry or other short-range communications circuitry) that geo-fences the payspot by broadcasting the identifier only within a limited distance from the mobile device.

Payspot detection module 704 may detect one or more identifiers of one or more payment hotspots broadcast by the payspot generation modules of one or more other mobile devices (e.g., using communications circuitry such as the short-range communications circuitry). Payspot interaction module 706 may exchange communications with the payment provider server (e.g., directly or via a payspot generated by another mobile device). For example, the payspot interaction module 706 may provide (e.g., via the payspot generated by another mobile device) a request to the payment provider server for the payment provider server to process a transfer of funds between a second user and a first user.

Any or all of modules 702, 704, and/or 706 may be implemented as a subsystem of the device 700 including for example, a circuit, a hardware component, a hardware subcomponent, and/or a variety of other subsystems known in the art. Furthermore, any or all of the modules 702, 704, and/or 706 may be preconfigured to perform their disclosed functionality, or may be configured by a processing system "on-the-fly" or as needed to perform their disclosed functionality. As such, any or all of the modules 702, 704, and/or 706 may include pre-configured and dedicated circuits and/or hardware components of the mobile device 700, or may be circuits and/or hardware components that are configured as needed.

For example, any or all of the modules 702, 704, and/or 706 may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 702, 704, and/or 706 to perform the functions described above. As such, in some embodiments, preconfigured and dedicated circuits may be implemented to perform the functions of the modules 702, 704, and/or 706. In other embodiments, a processing system may execute instructions on a non-transitory, computer-readable medium to configure one or more circuits as needed to perform the functions of the modules 702, 704, and/or 706.

A communications module (not shown) may be included in device 700 as a separate module or may be provided using instructions stored on a computer-readable medium that, when executed by a processing system in the device 700, configure the communications module to send and receive information over a network as, for example, described herein, as well as provide any of the other functionality that is discussed above. Payspot generation module 702 may be included as a separate module provided in the device 700, or may be provided using instructions stored on a computer-readable medium that, when executed by a processing system in the device 700, configure payspot generation module 702 to provide any of the functionality that is discussed above. Payspot detection module 704 may be included as a separate module provided in the device 700, or may be provided using instructions stored on a computer-readable medium that, when executed by a processing system in the device 700, configure payspot detection module 704 to provide any of the functionality that is discussed above. Payspot interaction module 706 may be included as a separate module provided in the device 700, or may be provided using instructions stored on a computer-readable medium that, when executed by a processing system in the device 700, configure payspot interaction module 706 to provide any of the functionality that is discussed above. Furthermore, other modules discussed above but not illustrated in FIG. 7 may be provided as separate modules on the device 700, or using instructions stored on a computer-readable medium similarly as discussed above.

Figure 8:
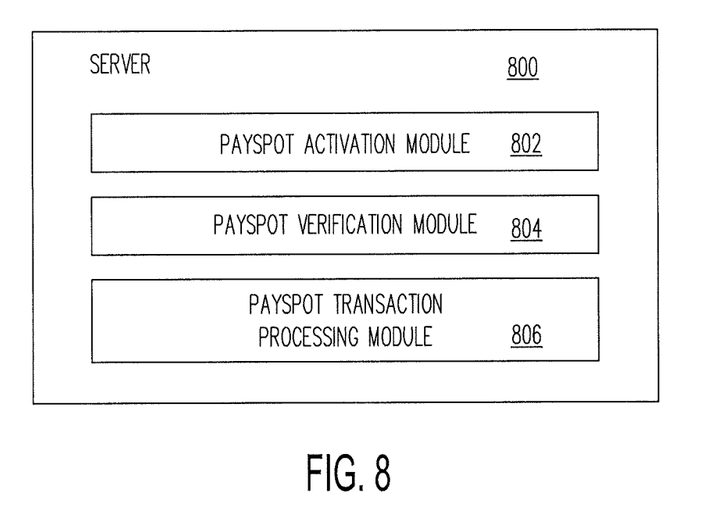
FIG. 8 is a block diagram of an improved server, the functioning of which is modified by the inclusion of various payspot modules for processing transfers of funds according to an embodiment.

FIG. 8 shows an embodiment of a server (e.g., an implementation of a payment provider server such as server 130 of FIG. 1) that may be used for activating payment hotspots, generating identifiers associated with payment hotspots and user identifiers and/or transferring funds between users interacting through a payment hotspot as described herein. As shown in FIG. 8, server 800 may include one or more payspot processing modules that provide specific improved server functionality for facilitating person-to-person payments without exposing user-identifying information.

The payspot processing modules of server 800 may include payspot activation module 802, a payspot verification module 804, and/or a payspot transaction processing module 806. Payspot activation module 802 may activate a payment hotspot in response to a first request from a first user device of a first user to generate the payment hotspot. Activating the payment hotspot may include determining a unique identifier for the hotspot, linking the unique identifier with a user identifier of the first user, and providing the unique identifier to the first user.

Payspot verification module 804 may receive a second request for a payment from a second user device of a second user via the payment hotspot. The payment request may be received from the second user device via the first user device. For example, by sending a payment request to a payspot generated by a first user device, a second user device may send the payment request to the payment provider server using the communications circuitry of the first user device that is in communication with the server.

Payspot transaction processing module 806 may facilitate a transfer of funds to the first user from the second user based on the second request. For example, the payment verification module 804 may determine whether an account of the second user has funds equal to or greater than the amount of the requested payment, and if the account of the second user has the funds, payspot transaction processing module 806 may transfer the funds from the account of the second user to an account of the first user that is associated with the user identifier and the payment hotspot.

Any or all of modules 802, 804, and/or 806 may be implemented as a subsystem of the server 800 including for example, a circuit, a hardware component, a hardware subcomponent, and/or a variety of other subsystems known in the art. Furthermore, any or all of the modules 802, 804, and/or 806 may be preconfigured to perform their disclosed functionality, or may be configured by a processing system "on-the-fly" or as needed to perform their disclosed functionality. As such, any or all of the modules 802, 804, and/or 806 may include pre-configured and dedicated circuits and/or hardware components of the server 800, or may be circuits and/or hardware components that are configured as needed.

For example, any or all of the modules 802, 804, and/or 806 may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 802, 804, and/or 806 to perform the functions described above. As such, in some embodiments, preconfigured and dedicated circuits may be implemented to perform the functions of the modules 802, 804, and/or 806. In other embodiments, a processing system may execute instructions on a non-transitory, computer-readable medium to configure one or more circuits as needed to perform the functions of the modules 802, 804, and/or 806.

A communications module (not shown) may be included in server 800 as a separate module or may be provided using instructions stored on a computer-readable medium that, when executed by a processing system in the server 800, configure the communications module to send and receive information over a network as, for example, described herein, as well as provide any of the other functionality that is discussed above. Payspot activation module 802 may be included as a separate module provided in the server 800, or may be provided using instructions stored on a computer-readable medium that, when executed by a processing system in the server 800, configure payspot activation module 802 to provide any of the functionality that is discussed above. Payspot verification module 804 may be included as a separate module provided in the server 800, or may be provided using instructions stored on a computer-readable medium that, when executed by a processing system in the server 800, configure payspot verification module 804 to provide any of the functionality that is discussed above. Payspot transaction processing module 806 may be included as a separate module provided in the server 800, or may be provided using instructions stored on a computer-readable medium that, when executed by a processing system in the server 800, configure payspot transaction processing module 806 to provide any of the functionality that is discussed above. Furthermore, other modules discussed above but not illustrated in FIG. 8 may be provided as separate modules on the server 800, or using instructions stored on a computer-readable medium similarly as discussed above.

Figure 9:
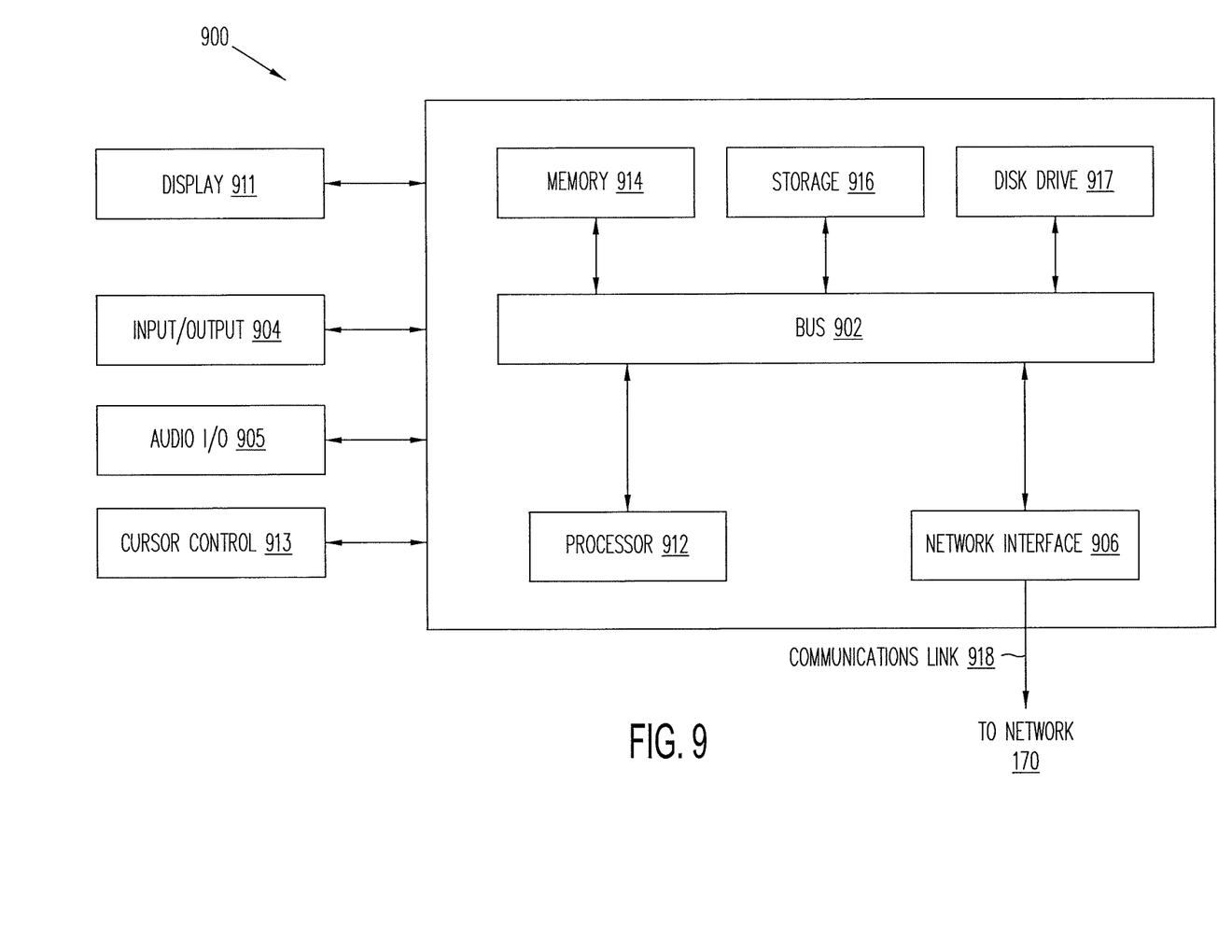
FIG. 9 is a block diagram of a computer system suitable for implementing one or more components in FIG. 1, according to an embodiment.

FIG. 9 is a block diagram of a computer system suitable for implementing one or more components in FIG. 1, FIG. 7, and/or FIG. 8, according to an embodiment. In various embodiments, the user device(s) may each comprise a personal computing device (e.g., smart phone, a computing tablet, a personal computer, laptop, PDA, Bluetooth device, key FOB, badge, etc.) capable of communicating with the network. The merchant device and/or server may utilize a network computing device (e.g., a network server) capable of communicating with the network. It should be appreciated that each of the devices utilized by users and service providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons, image, or links, and/or moving one or more images, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another user device, a merchant device, or a service provider server via network 170. In one embodiment, the transmission is wireless, although other transmission mediums and methods may also be suitable. One or more processors 912, which may be a microcontroller, digital signal processor (DSP), or other processing component, processes these various signals, such as for display on computer system 900 or transmission to other devices via a communication link 918. Processor(s) 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor(s) 912 and other components by executing one or more sequences of instructions contained in system memory component 914. Logic may be encoded in a computer readable medium, which may refer to any medium that participates in providing instructions to processor(s) 912 for execution. Such a medium may take many forms, including but not limited to, non-volatile media, volatile media, and transmission media. In various embodiments, non-volatile media includes optical or magnetic disks, volatile media includes dynamic memory, such as system memory component 914, and transmission media includes coaxial cables, copper wire, and fiber optics, including wires that comprise bus 902. In one embodiment, the logic is encoded in non-transitory computer readable medium. A non-transitory computer-readable medium may include instructions which, in response to execution by a computer system, cause the computer system to perform some or all of one or more methods as described herein. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 900. In various other embodiments of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
receiving a first request from a first user device associated with a first user account to generate a payment hotspot;
in response to receiving the first request, generating, for the first user account, the payment hotspot and an identification code that uniquely identifies the payment hotspot;
transmitting the identification code to the first user device;
receiving a second request for a payment from a second user device associated with a second user account, wherein the second request is associated with the identification code; and
in response to receiving the second request, facilitating a transfer of funds from the second user account to the first user account.

2. The system of claim 1, wherein the second request is received directly from the second user device.

3. The system of claim 1, wherein the second request is received indirectly from the second user device via the first user device.

4. The system of claim 3, wherein the generating the payment hotspot comprises configuring the first user device to be electronically discoverable by the second user device.

5. The system of claim 1, wherein the payment hotspot is associated with a geographical boundary, wherein the operations further comprise determining that the second user device is within the geographical boundary when the second request is received.

6. The system of claim 5, wherein the geographical boundary is determined based on a geographical location of the first user device.

7. The system of claim 6, wherein the operations further comprise in response to determining that the first user device has left the geographical location, terminating the payment hotspot.

8. The system of claim 1, wherein the operations further comprise prior to receiving the second request:
receiving, from the second user device, a message comprising the identification code;
in response to receiving the message from the second user device, granting the second user device access to the payment hotspot; and
causing the first user device to establish a peer-to-peer communication channel with the second user device.

9. The system of claim 1, wherein the second request lacks information that identifies the first user account.

10. The system of claim 1, wherein the operations further comprise in response to detecting a predetermined condition, terminating the payment hotspot.

11. The method of claim 1, wherein the second request lacks information that identifies the first user account.

12. A method comprising:
receiving, by one or more hardware processors, a first request from a first user device associated with a first user account to generate a payment hotspot;
in response to receiving the first request, generating, by the one or more hardware processors for the first user account, the payment hotspot, wherein the payment hotspot is associated with a geographical boundary;
receiving, by the one or more hardware processors via the payment hotspot, a second request for a payment from a second user device associated with a second user account, wherein the second request lacks information that identifies the first user account;
determining that the second user device is located within the geographical boundary associated with the payment hotspot; and
in response to receiving the second request and determining that the second user device is located within the geographical boundary, facilitating, by the one or more hardware processors, a transfer of funds from the second user account to the first user account.

13. The method of claim 12, wherein the second request is received directly from the second user device.

14. The method of claim 12, wherein the second request is received indirectly from the second user device via the first user device.

15. The method of claim 12, further comprising:
generating an identification code for the payment hotspot; and
transmitting the identification code to the first user device, wherein the second request comprises the identification code.

16. The method of claim 12, wherein the geographical boundary is determined based on a geographical location of the first user device.

17. The method of claim 12, further comprising in response to determining that the first user device has left the geographical location, terminating the payment hotspot.

18. The method of claim 12, further comprising prior to receiving the second request:
- receiving, from the second user device, a message comprising the identification code;
- in response to receiving the message from the second user device, granting the second user device access to the payment hotspot; and
- causing the first user device to establish a peer-to-peer communication channel with the second user device.

19. A non-transitory machine readable medium having stored thereon machine-readable instructions executable to cause a machine to perform operations comprising:
- receiving a first request from a first user device associated with a first user account to generate a payment hotspot;
- in response to receiving the first request, generating, for the first user account, the payment hotspot and an identification code that uniquely identifies the payment hotspot;
- receiving a second request for a payment from a second user device associated with a second user account, wherein the second request comprises the identification code but lacks information that identifies the first user account; and
- in response to receiving the second request, facilitating a transfer of funds from the second user account to the first user account.

20. The non-transitory machine readable medium of claim 19, wherein the operations further comprise prior to receiving the second request:
- receiving, from the second user device, a message comprising the identification code;
- in response to receiving the message from the second user device, granting the second user device access to the payment hotspot; and
- causing the first user device to establish a peer-to-peer communication channel with the second user device.

* * * * *

UNITED STATES PATENT AND TRADEMARK OFFICE
CERTIFICATE OF CORRECTION

| | |
|---|---|
| PATENT NO. | : 10,296,890 B2 |
| APPLICATION NO. | : 15/729467 |
| DATED | : May 21, 2019 |
| INVENTOR(S) | : Magesh Babu Meignana Sundaram |

It is certified that error appears in the above-identified patent and that said Letters Patent is hereby corrected as shown below:

In the Specification

In the Detailed Description:

Column 5, Line 37, change "device. 200 that encloses" to --device 200 that encloses--

Signed and Sealed this
Twenty-eighth Day of April, 2020

Andrei Iancu
*Director of the United States Patent and Trademark Office*